Patented June 11, 1946

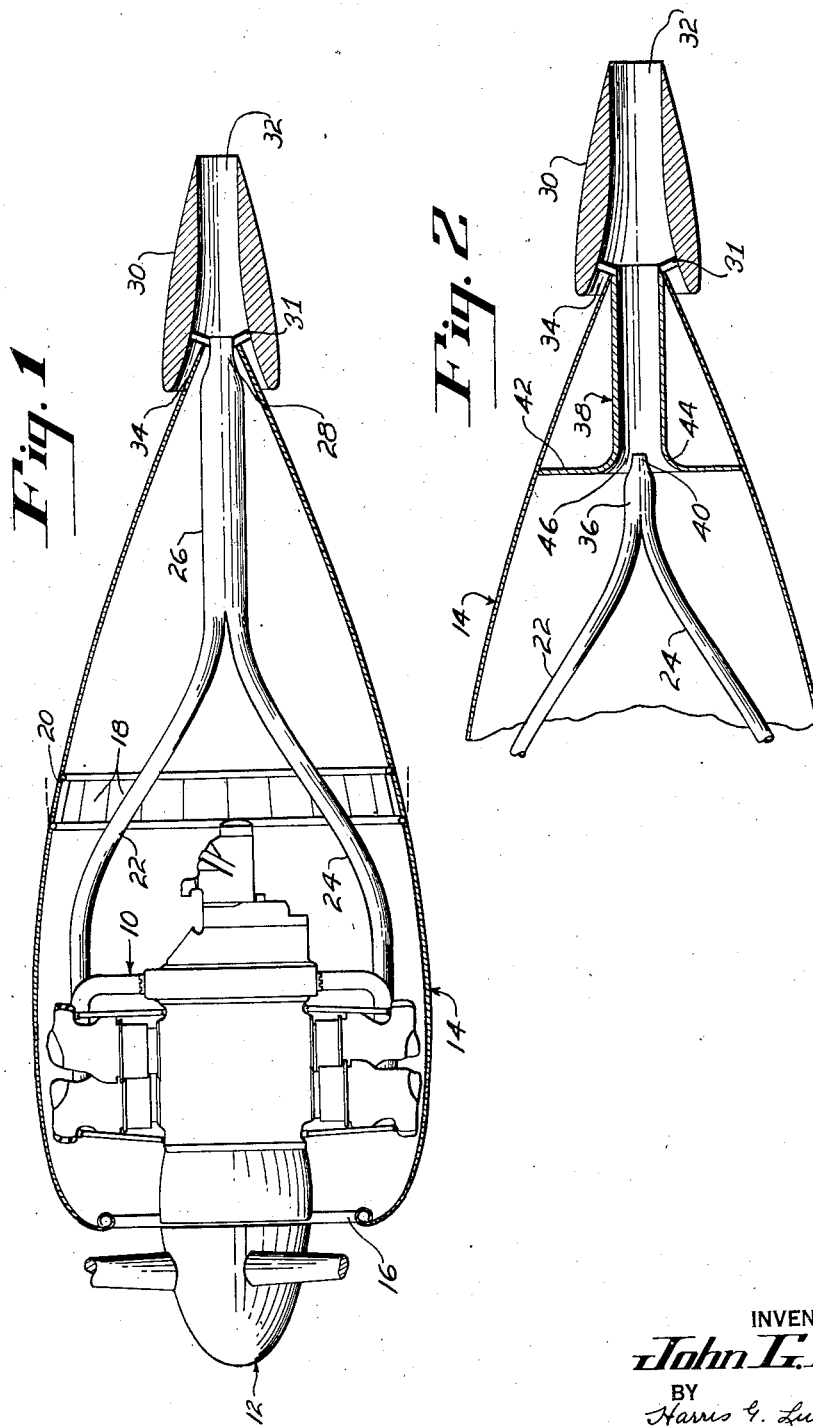

2,401,941

UNITED STATES PATENT OFFICE 2,401,941

EXHAUST THRUST AUGMENTER

John G. Lee, Farmington, Conn., assignor to United Aircraft Corporation, East Hartford, Conn., a corporation of Delaware Application October 29, 1940, Serial No. 363,309

2 Claims. (Cl. 60—35.6)

This invention relates to improvements in vehicle power plants and has particular reference to an improved power plant for a high-speed aircraft.

An object of the invention resides in the provision of improved means for utilizing the exhaust gas energy from such a power plant for reducing the drag of the power plant and augmenting the propulsive effort developed by the power plant.

A further object resides in the provision, in combination with a power plant including an engine and a streamlined engine enclosure, of means for directing the engine exhaust rearwardly in the wake of the enclosure and for utilizing the exhaust jet to energize the boundary layer over the rearward portion of the engine enclosure.

A still further object resides in the provision, in combination with an enclosure, of means for directing an exhaust gas jet rearwardly into the wake of the enclosure and for augmenting the reactive effect of such a jet by inductively forcing a stream of external air rearwardly along with the jet and for drawing at least a portion of said external air from the rearward portion of the surface of the enclosure.

An additional object resides in the provision, in combination with a vehicle power plant including an engine and streamlined engine enclosure, of means for directing an engine exhaust gas jet rearwardly into the wake of the enclosure, for augmenting such an exhaust gas jet with an inductive flow of engine cooling air from the interior of the enclosure before the jet leaves the enclosure and for further augmenting the jet by an induced flow of external air admitted to the jet after leaving the enclosure, at least a portion of such external air being drawn from the rearward portion of the surface of the streamlined enclosure.

Other objects and advantages will be more particularly pointed out hereinafter or will become apparent as the description proceeds.

In the accompanying drawing, in which like reference numerals are used to designate similar parts throughout, there is illustrated, in somewhat diagrammatic form, a suitable mechanical arrangement for the purpose of disclosing the invention and a somewhat modified arrangement. The drawing, however, is for the purpose of illustration only and is not to be taken as limiting or restricting the invention since it will be apparent to those skilled in the art that various changes in the illustrated arrangement may be resorted to without in any way exceeding the scope of the invention.

In the drawing,

Fig. 1 is a diagrammatic longitudinal sectional view through a power plant enclosure showing a power plant and an exhaust ejector constructed according to the invention, and Fig. 2 is a view similar to Fig. 1 of a fragmentary portion of the power plant and enclosure showing a modified form of exhaust ejector.

Referring to the drawing in detail and particularly to Fig. 1, the numeral 10 generally indicates an engine such as an aircooled radial internal-combustion engine conventionally employed for the propulsion of aircraft. It is to be understood, however, that the invention is not limited to any particular type of engine so long as the engine exhaust contains energy which may be converted into propulsive effort by a reactive jet. The numeral 12 generally indicates an aeronautical propeller driven by the engine 10 and the numeral 14 generally indicates a streamlined enclosure or nacelle which for the purposes of this disclosure is shown as an enclosure for the engine and its accessories. It should be understood, however, that the invention is not limited to an engine nacelle and may be applied to any suitable body. The nacelle may have a front opening 16 for the introduction of engine cooling air and may be provided with a suitable cooling air exit such as the slot or gill opening 18 the opening of which may be controlled by the flaps 20 in a manner well known to the art.

The nacelle 14 is of a generally streamlined shape and tapers rearwardly substantially to a point to provide a body of minimum aerodynamic resistance for the required maximum diameter. This point may project beyond the portion of the vehicle, such as an airplane, upon which the nacelle is mounted and is preferably positioned so as to be somewhat spaced from other surfaces.

Each engine cylinder, or small group of cylinders, is provided with an individual exhaust conduit, two of which are indicated at 22 and 24. These individual conduits extend rearwardly of the engine and, within the nacelle 14, may be grouped as a cluster of individual conduits or may merge into a common rearwardly directed exhaust pipe or stack 26. This stack 26 extends to the rearward end of the nacelle 14 and may be provided at its rearward end with a nozzle 28 for ejecting the exhaust gases at high speed from the rearward end of the nacelle. An external thrust augmenter 30 is positioned at the rear of the nacelle with its aperture 32 in alignment with the open end of the exhaust stack 26 and its forward end spaced from the surface of the rearward end of the nacelle to provide a narrow annular passage 34 leading in to the augmenter from the surface of the rearward portion of the nacelle. The main passage 32 through the augmenter 30 is given a suitable shape such as will provide a flow of the exhaust gases, to assist in inducing a flow of external air through the passage 34 into the main augmenter passage 32. This shape may be in the general form of a funnel or a conduit with a flared entrance portion. The augmenter or nozzle 30 may be supported in any suitable or convenient manner, for instance by struts 31, at the rearward end of the nacelle 14 and should be formed of or lined with some heat resistant or non-combustible material. It has a smooth convex outer surface of streamlined shape and a maximum diameter of less than one-half the maximum diameter of the nacelle in order to provide a nozzle of low drag and has its front end positioned near the rear end of the nacelle.

From the above described construction it is apparent that the exhaust gases flowing rearwardly through the exhaust pipes 22 and 24 and the stack 26 will be ejected as a high speed jet into the augmenter 30 and will act on air in the augmenter 30 to draw or force that air therethrough. The flow of air to replace the ejected air will be into the augmenter opening 34. This action of the exhaust jet reduces the air pressure in the flared portion 34 of the augmenter while substantially atmospheric pressure is maintained over the outside of the augmenter. The resulting pressure difference produces a useful thrust which augments the thrust normally obtained from the jet alone. Under certain conditions it may be possible to recover additional energy and convert it to useful thrust in the augmenter by burning unburned fuel portions contained in the exhaust gas as they pass through the augmenter but it should be understood that thrust augmentation may be obtained without this additional burning. In addition, the intake of air through the annular passage 34 will materially decrease the resistance of the nacelle 14 by reenergizing the rearward portion of the boundary layer of air on the nacelle. As the air flows past the nacelle the air flow along the forward portion of the nacelle will be substantially streamlined or will flow in a manner known as stratified flow if the nacelle is properly shaped and its surface is smooth. Stratified flow describes a condition in which all of the air flows along the nacelle in the same direction without eddys or turbulence although the layer immediately adjacent the nacelle flows comparatively slowly due to the friction between this thin layer and the nacelle surface and the layer immediately outside of this inner boundary layer flows somewhat faster than the boundary layer, the rate of flow through successive layers gradually increasing until at a short distance from the nacelle surface the relative speed of the airflow is the same as the relative speed of the object through the air. While this stratified flow will continue for some distance rearwardly from the front end of the object, such as the nacelle 14, it has been found that, owing to the friction between the surface of the object and the immediate boundary layer and the friction between the succeeding layers of air flowing along the nacelle, that the speed of the air flow relative to the nacelle progressively decreases as the flow continues rearwardly of the nacelle and that the distance between the nacelle and the layer of air which has the speed of flow relative to the nacelle equal to the speed at which the nacelle travels through the air gradually increases and that as this distance increases there is a strong tendency for turbulence to build up along the rearward portion of the nacelle surface which increased distance of stratification and actual or incipient turbulence materially increases the resistance of the object to progress through the air. Since the intake of air through the passage 34 is from this stratified zone and includes the boundary layer, the suction produced by this air intake will minimize the frictional retardation of the air along the surface of the rearward portion of the object and will thereby decrease the thickness of stratification and materially delay the occurrence of turbulence along the surface of the object thereby materially decreasing the aerodynamic resistance of the object at high relative speeds.

It has also been found that if the entrance 34 to the augmenter is placed in a region of comparatively still air the thrust augmentation is greater than if the entrance is placed in a region where the air velocity is high relative to the augmenter 30. Thus placing the augmenter at the rear of a nacelle or wing or other streamlined object accomplishes a double purpose of reducing the drag of the nacelle or other object by improving the airflow thereover, as the boundary layer is drawn into the augmenter, and also of rendering the augmenter more efficient by creating more favorable air conditions at the augmenter entrance.

In the form of the invention shown in Fig. 2 the stack 36 is made shorter than the stack 26 shown in Fig. 1 and terminates well within the interior of the nacelle. A tubular member 38, preferably formed of or lined with a heat resistant material and, if necessary, provided with surface cooling means, is interposed between the nozzle 40 at the rearward end of the stack 36 and the end of the nacelle. This member 38 is provided at its forward end with a radial extension 42 which forms a transverse wall or partition in the rearward portion of the nacelle and this wall is joined to the tubular portion by a suitable fillet 44 which provides an air passage 46 surrounding the nozzle 40. With this arrangement engine cooling air entering the nacelle through the front opening 16 is ejected by the exhaust gas jet through the tubular member 38 thereby providing an induced flow of cooling air through the nacelle and materially improving the efficiency of the engine cooling arrangement. The mixture of exhaust gas and cooling air flowing through the member 38 is ejected into the external nozzle 30 where it is further mixed with external air entering the nozzle through the passage 34 to provide the propulsive effort and decrease in resistance described above.

While a suitable mechanical arrangement and one somewhat modified form thereof have been hereinabove described and illustrated in the accompanying drawing for the purpose of disclosing the invention, it is to be understood that the invention is not limited to the particular arrangements so illustrated and described, but that such changes in the size, shape and arrangements of the various parts may be resorted to as come within the scope of the subjoined claims.

Having now described the invention so that others skilled in the art may clearly understand the same, what it is desired to secure by Letters Patent is as follows:

1. In a propeller driven aircraft having a power plant including an internal combustion engine and a streamlined nacelle enclosing said engine, means for reducing the aerodynamic resistance or drag of said nacelle comprising, an ejector tube of streamlined form and of considerably smaller maximum diameter than said nacelle positioned adjacent the rear end of said nacelle, an air entrance opening for said ejector tube positioned to withdraw air from the airstream passing over said nacelle at the comparatively dead air region thereof adjacent the rear end of said nacelle, a restricted passage in said ejector tube to the rear of said entrance opening, an energizing nozzle at the rear of said nacelle positioned to discharge exhaust gas from said engine as a fluid jet into said restricted passage for aspirating air from said airstream adjacent said entrance opening into said ejector tube, and means for conducting exhaust gas from said engine to said energizing nozzle.

2. In a propeller driven aircraft having a power plant including an internal combustion engine and a streamlined nacelle enclosing said engine and provided with means for admitting air into the nacelle for cooling the engine, means for reducing the aerodynamic resistance or drag of said nacelle comprising, an ejector tube of streamlined form and of considerably smaller maximum diameter than said nacelle positioned adjacent the rear end of said nacelle, an air entrance opening for said ejector tube positioned to withdraw air from the airstream passing over said nacelle at the comparatively dead air region thereof adjacent the rear end of said nacelle, a restricted passage in said ejector tube to the rear of said entrance opening, an energizing nozzle at the rear of said nacelle positioned to discharge exhaust gas from said engine as a fluid jet into said restricted passage for aspirating air from said airstream adjacent said entrance opening into said ejector tube, means for conducting exhaust gas from said engine to said energizing nozzle, and means for admitting said engine cooling air from said nacelle into said energizing nozzle.

JOHN G. LEE.